US012794089B2

(12) United States Patent
Lin et al.

(10) Patent No.: US 12,794,089 B2
(45) Date of Patent: Nov. 10, 2026

(54) TAB WELDING METHOD, WELDING TOOL, BATTERY CELL, BATTERY, AND ELECTRIC DEVICE

(71) Applicant: CONTEMPORARY AMPEREX TECHNOLOGY (HONG KONG) LIMITED, Hong Kong (CN)

(72) Inventors: Chuandong Lin, Ningde (CN); Jiang Lin, Ningde (CN); Fei Xue, Ningde (CN)

(73) Assignee: CONTEMPORARY AMPEREX TECHNOLOGY (HONG KONG) LIMITED, Hong Kong (CN)

(*) Notice: Subject to any disclaimer, the term of this patent is extended or adjusted under 35 U.S.C. 154(b) by 485 days.

(21) Appl. No.: 18/428,727

(22) Filed: Jan. 31, 2024

(65) Prior Publication Data

US 2024/0170809 A1 May 23, 2024

Related U.S. Application Data

(63) Continuation of application No. PCT/CN2022/127902, filed on Oct. 27, 2022.

(30) Foreign Application Priority Data

Nov. 9, 2021 (CN) ........................ 202111318931.2

(51) Int. Cl.
*H01M 50/536* (2021.01)
*B23K 20/10* (2006.01)
(Continued)

(52) U.S. Cl.
CPC .......... *H01M 50/536* (2021.01); *B23K 20/10* (2013.01); *H01M 10/0413* (2013.01);
(Continued)

(58) Field of Classification Search
CPC .......... H01M 50/536; H01M 10/0413; H01M 50/54; H01M 2220/20; H01M 10/058;
(Continued)

(56) References Cited

U.S. PATENT DOCUMENTS

2016/0043360 A1 2/2016 Byun et al.
2021/0135321 A1 5/2021 Chen

FOREIGN PATENT DOCUMENTS

CN 102513686 A 6/2012
CN 104396050 A 3/2015
(Continued)

OTHER PUBLICATIONS

The European Patent Office (EPO) The Extended European Search Report for Application No. 22891807.4 Apr. 7, 2025 8 Pages.
(Continued)

*Primary Examiner* — Helen Oi K Conley
(74) *Attorney, Agent, or Firm* — ANOVA LAW GROUP, PLLC

(57) ABSTRACT

A tab welding method includes performing a first welding on a plurality of stacked layers of positive tabs and negative tabs using a toothed welding head, to form a tab body having a first weld spot region, in such a manner that a solid-phase connection is performed on the plurality of stacked layers of positive tabs and negative tabs; and performing a second welding on the tab body using a toothless welding head, to form a second weld spot region, in such a manner that after the first welding, a formed uneven region is shaped and flattened.

19 Claims, 6 Drawing Sheets

(51) Int. Cl.
*H01M 10/04* (2006.01)
*H01M 50/54* (2021.01)
*B23K 101/36* (2006.01)

(52) U.S. Cl.
CPC ......... *H01M 50/54* (2021.01); *B23K 2101/36* (2018.08); *H01M 2220/20* (2013.01)

(58) Field of Classification Search
CPC ............. H01M 50/516; H01M 50/534; H01M 50/538; H01M 4/139; B23K 20/10; B23K 2101/36; B23K 2101/38; B23K 26/244; B23K 26/60; Y02E 60/10
See application file for complete search history.

(56) References Cited

FOREIGN PATENT DOCUMENTS

| | | | |
|---|---|---|---|
| CN | 110936010 | A | 3/2020 |
| CN | 211072230 | U | 7/2020 |
| CN | 111554960 | A | 8/2020 |
| CN | 111867775 | A | 10/2020 |
| CN | 112421188 | A | 2/2021 |
| CN | 112453735 | A | 3/2021 |
| CN | 112652865 | A | 4/2021 |
| CN | 113042874 | A | 6/2021 |
| DE | 102012018912 | A1 | 3/2013 |
| DE | 102018221843 | A1 | 6/2020 |
| JP | 2015199095 | A | 11/2015 |
| JP | 2016219274 | A | 12/2016 |
| WO | 2013105361 | A1 | 7/2013 |

OTHER PUBLICATIONS

The World Intellectual Property Organization (WIPO) International Search Report and Written Opinion for PCT/CN2022/127902 Jan. 16, 2023 17 pages (including English translation).
The China National Intellectual Property Administration (CNIPA) Notification to Grant Patent Right for Invention 202111318931.2 Oct. 25, 2023 3 Pages (With Translation).
The China National Intellectual Property Administration (Cnipa) The First Office Action for Chinese Application 202111318931.2 Aug. 31, 2023 15 Pages (With Translation).

TAB WELDING METHOD, WELDING TOOL, BATTERY CELL, BATTERY, AND ELECTRIC DEVICE

CROSS-REFERENCE TO RELATED APPLICATIONS

This application is a continuation of International Application No. PCT/CN2022/127902, filed on Oct. 27, 2022, which claims priority to Chinese Patent Application No. 202111318931.2, titled "TAB WELDING METHOD, WELDING TOOL, BATTERY CELL, BATTERY, AND ELECTRIC DEVICE", and filed on Nov. 9, 2021, the entire contents of both of which are incorporated herein by reference.

FIELD

The present disclosure relates to the field of battery technologies, and more particularly, to a tab welding method, a welding tool, a battery cell, a battery, and an electric device.

BACKGROUND

A battery cell is the smallest unit that makes up a battery, and includes an end cover, a housing, and an electrode assembly. The end cover and the housing are used together to form an internal space for accommodating the electrode assembly. The electrode assembly typically includes a positive electrode sheet, a negative electrode sheet, and a separator located therebetween. Active substances on the positive electrode sheet and the negative electrode sheet form poles, while inactive substances on the positive electrode sheet and the negative electrode sheet form tabs.

However, when welding is performed on the plurality of stacked layers of a positive tabs and a negative tabs, interlayer gaps exist in the positive tab and the negative tab that have been subject to the welding. As a result, when the welded tabs are again fixed to the poles through welding, a large number of pores are easily generated. In addition, a large amount of heat buildup during the welding leads to cracks in a fusion region, which affects a current flow capacity and structural strength.

SUMMARY

Based on this, it is needed to provide a tab welding method, a welding tool, a battery cell, a battery, and an electric device regarding problems that pores and cracks are easily generated when a tab and a pole are welded and fixed to each other.

In a first aspect, the present disclosure provides a tab welding method. The tab welding method includes: step S10 of forming tabs, comprising forming a plurality of stacked layers of positive tabs and negative tabs by sequentially stacking a plurality of layers of positive electrode sheets and a plurality of layers of negative electrode sheets; step S20 of performing a first welding, comprising performing welding on the plurality of stacked layers of positive tabs and negative tabs using a toothed welding head, to form a tab body having a first weld spot region; and S30, step of S30 of performing a second welding, comprising performing the second welding on the tab body using a toothless welding head, to form a second weld spot region.

In technical solutions according to embodiments of the present disclosure, the uneven first weld spot region formed after the welding of the toothed welding head is shaped and flattened by the toothless welding head, which avoids a slip during ultrasonic vibrations, and eliminates gaps of the plurality of stacked layers of tabs of the tab body.

In some embodiments, in step S20, the toothed welding head has a size of 5 mm×30 mm.

In some embodiments, in step S20, the toothed welding head has a weld tooth height of 0.45 mm.

In some embodiments, in step S20, the toothed welding head has a weld tooth radius of 0.8 mm and a weld tooth pitch of 0.32 mm.

In some embodiments, in step S30, the toothless welding head has a welding surface formed as a smooth surface.

In the technical solutions according to the embodiments of the present disclosure, an uneven region formed after the first welding is shaped and flattened by the toothless welding head, which avoids the slip during ultrasonic vibrations, and eliminates the gaps gaps of the plurality of stacked layers of the tabs of the tab body.

In some embodiments, in step S30, the toothless welding head has a size of 4 mm×20 mm.

In the technical solutions according to the embodiments of the present disclosure, with structures of the toothed welding head and the toothless welding head described above, the first weld spot region welded by the toothed welding head has an area of 5 mm×30 mm, while the second weld spot region welded by the toothless welding head has an area of 4 mm×20 mm, in such a manner that the second weld spot region is located within the first weld spot region.

Since a structure of stacked tabs is welded by using the high toothed welding head during the first welding, a solid-phase connection is realized between the tabs. Compared with a flat-tooth welding head, the toothed welding head has higher strength, and thus a welding part is less likely to be broken apart by the ultrasonic vibrations during the second welding.

In some embodiments, the toothless welding head has an arc chamfer with a radius of 1 mm.

In the technical solutions according to the embodiments of the present disclosure, with the arc chamfer, the welding head can be in close contact with a weld spot region during welding, which improves welding performance.

In some embodiments, the second weld spot region is smaller than the first weld spot region, the first weld spot region has a center point coinciding with a center point of the second weld spot region.

In the technical solutions according to the embodiments of the present disclosure, since the second weld spot region is smaller than the first weld spot region and located above the first weld spot region, a slip caused when the toothless welding head performs welding on the smooth surface can be avoided, and thus an uneven part can be shaped and flattened, eliminating the interlayer gaps.

In some embodiments, each of the first welding and the second welding is ultrasonic welding.

In a second aspect, the present disclosure provides a tab welding tool, for performing the above-mentioned tab welding method. The tab welding tool includes the toothless welding head. The toothless welding head has a welding surface formed as a smooth surface.

In the technical solutions according to the embodiments of the present disclosure, the uneven region formed after the first welding is shaped and flattened by the toothless welding head, which avoids the slip during the ultrasonic vibrations, and eliminates the gaps of the plurality of stacked layers of the tabs of the tab body.

In some embodiments, the toothless welding head has a size of 4 mm×20 mm.

In some embodiments, the toothless welding head has an arc chamfer with a radius of 1 mm.

In the technical solutions according to the embodiments of the present disclosure, with the arc chamfer, the welding head can be in close contact with the weld spot region during welding, which improves the welding performance.

In some embodiments, the tab welding tool includes the toothed welding head. The toothed welding head has a welding region formed as the first weld spot region, and the toothless welding head has a welding region formed as the second weld spot region. The second weld spot region is smaller than the first weld spot region. The first weld spot region has a center point coinciding with a center point of the second weld spot region.

In some embodiments, the toothed welding head has a size of 5 mm×30 mm.

In some embodiments, the toothed welding head has a weld tooth height of 0.45 mm.

In some embodiments, the toothed welding head has a weld tooth radius of 0.8 mm and a weld tooth pitch of 0.32 mm.

In a third aspect, the present disclosure provides a battery cell. The battery cell is prepared by the above-mentioned tab welding method.

In a fourth aspect, the present disclosure provides a battery. The battery includes a housing and the above-mentioned battery cell. The battery cell is disposed in the housing.

In a fifth aspect, the present disclosure provides an electric device. The electric device includes an electrical body and the above-mentioned battery.

With the tab welding method, the welding tool, the battery cell, the battery, and the electric device that are described above, the first welding is performed, using the toothed welding head, on the plurality of stacked layers of the positive tabs and the negative tabs, in such a manner that the solid-phase connection of the plurality of stacked layers of the positive tabs and the negative tabs is formed. Then, the flat welding is performed using the toothless welding head to shape and flatten an uneven region formed after the first welding, to eliminate gaps of the plurality of stacked layers of the positive tabs and the negative tabs.

The above description is merely an overview of the technical solutions of the present disclosure. To facilitate a clear understanding of technical means of the present disclosure and the implementations of the technical solutions in accordance with the contents of the specification, and to clarify and explain the above and other objects, features, and advantages of the present disclosure, specific embodiments of the present disclosure will be described below.

BRIEF DESCRIPTION OF THE DRAWINGS

Various other advantages and benefits will become apparent to those skilled in the art after reading the detailed description of embodiments given below. The accompanying drawings are used for a purpose of illustrating the embodiments only, rather than limiting the present disclosure. In addition, same elements are denoted by same reference numerals throughout the accompanying drawings. In the accompanying drawings.

Figure 1:
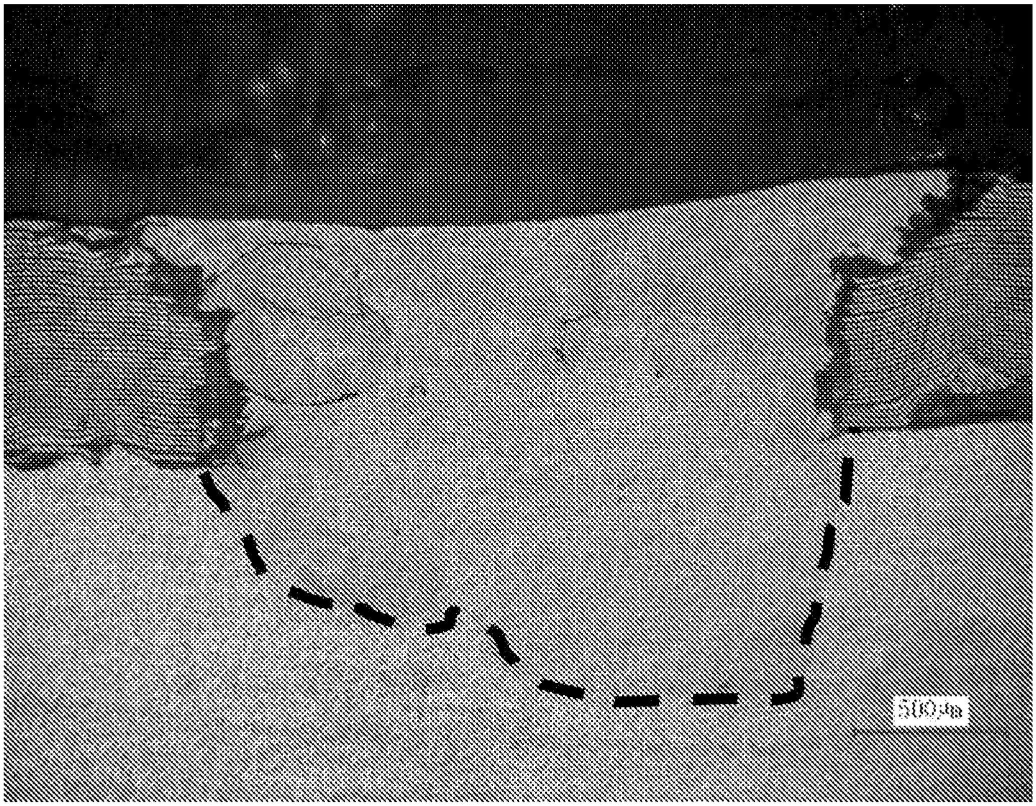
FIG. 1 is a view of an effect obtained after ultrasonic pre-welding in some scenarios.

1000, vehicle; 100, battery; 200, controller; 300, motor; 10, case; 20, battery cell; 30, tab body; 40, toothless welding head; 11, first portion; 12, second portion; 21, end cover; 22, housing; 23, electrode assembly; 31, first weld spot region; 32, second weld spot region; 21*a*, electrode terminal.

DETAILED DESCRIPTION

Embodiments of technical solutions of the present disclosure will be described in detail below with reference to the accompanying drawings. The following embodiments are only used to explain the technical solutions of the present disclosure more clearly, and therefore should be construed as examples only, rather than limitations of the protection scope of the present disclosure.

Unless otherwise defined, all technical and scientific terms used herein have the same meaning as commonly understood by those skilled in the art of the present disclosure. Terms in the present disclosure herein are only used for the purpose of describing specific embodiments, and are not intended to limit the present disclosure. Terms "including", "having", and any variations thereof in the specification, claims, and accompanying drawings of the present disclosure are intended to cover non-exclusive inclusions.

In the description of the embodiments of the present disclosure, the technical terms "first", "second", etc. are used to distinguish different objects, and cannot be understood as indicating or implying relative importance or implicitly specifying a number, a particular order, or a primary or secondary relationship of the indicated technical features. In the description of the embodiments of the present disclosure, "plurality" means at least two, unless otherwise specifically defined.

In the present disclosure, reference to "embodiment" means that a particular feature, structure, or characteristic described in conjunction with the embodiment or implementation may be included in at least one embodiment of the present disclosure. The presence of the term at each place in the specification does not necessarily refer to the same embodiment, nor does it refer to a separate or alternative embodiment that is mutually exclusive of other embodiments. It should be understood by those skilled in the art, both explicitly and implicitly, that the embodiments described herein may be combined with other embodiments.

In the description of the embodiments of the present disclosure, the term "and/or" only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

In the description of the embodiments of the present disclosure, the term "plurality" refers to more than two (including two). Similarly, "plurality of groups" refers to more than two groups (including two groups), and "plurality of pieces" refers to more than two pieces (including two pieces).

In the description of the embodiments of the present disclosure, the orientation or the position indicated by technical terms such as "center", "longitudinal", "lateral", "length", "width", "thickness", "over", "below", "front", "rear", "left", "right", "vertical", "horizontal", "top", "bottom", "inner", "outer", "clockwise", "anti-clockwise", "axial", "radial", and "circumferential" should be construed to refer to the orientation and the position as shown in the drawings, and is only for the convenience of describing the embodiments of the present disclosure and simplifying the description, rather than indicating or implying that the pointed device or element must have a specific orientation, or be constructed and operated in a specific orientation, and therefore cannot be understood as a limitation of the embodiments of the present disclosure.

In the description of the embodiments of the present disclosure, unless otherwise clearly specified and limited, technical terms such as "install", "connect", "connect to", "fix" and the like should be understood in a broad sense. For example, it may be a fixed connection or a detachable connection or connection as one piece; mechanical connection or electrical connection; direct connection or indirect connection through an intermediate; internal communication of two components or the interaction relationship between two components. For those skilled in the art, the specific meaning of the above-mentioned terms in the embodiments of the present disclosure can be understood according to specific circumstances.

At present, from the perspective of the development of the market, lithium-ion batteries are widely applied in electric vehicles and consumer electronic products due to their advantages such as high energy density, high output power, long cycle life, and low environmental pollution. With a continuous expansion of the application field of the lithium-ion batteries, a market demand for the lithium-ion batteries is also increasing.

A manufacturing process of the lithium-ion batteries usually includes: step 1 of preparing electrode slurry, mainly including mixing an electrode active substance, a binder, a solvent, etc., with each other, and then fully stirring and dispersing them to form a slurry; step 2 of coating, comprising uniformly coating the slurry prepared in step 1 onto a current collector (aluminum foil, copper foil, or the like) with a specified thickness, and the solvent is dried; step 3 of punching and cutting of electrode sheets, including punching each of the electrode sheets made in the previous step and cutting into a specified size and a specified shape; step 4 of stacking, including assembling and gluing positive electrode sheets, negative electrode sheets, and separators together, to form a pole core; and step 5 of assembling a hard-shell battery cell, including loading the pole core manufactured in the previous step into the punched shell and completing top sealing, side sealing, etc. (with a liquid injection opening reserved) to form the hard-shell battery cell injected with no liquid; step 6 of injecting liquid, including injecting a specified amount of electrolyte into the hard-shell battery cell; and step 7 of sealing a battery, including extracting a gas in the battery cell in a vacuum environment, and sealing the battery cell.

During the stacking described above, after a plurality of layers of positive electrode sheets is stacked to each other, active substances on the positive electrode sheets form positive poles and inactive substances on the positive electrode sheets form positive tabs. Similarly, after a plurality of layers of negative electrode sheets is stacked to each other, active substances on the negative electrode sheets form negative poles and inactive substances on the negative electrode sheets form negative tabs. The positive tabs and the negative tabs need to be stacked to each other and then welded together, and subsequently fixed to the poles through welding again.

At present, typically, ultrasonic pre-welding is performed on the plurality of stacked layers of the positive and negative tabs, and then a plurality of layers of pre-welded tabs is fixed to poles through laser welding. The ultrasonic pre-welding is performed, using a toothed welding head, on the plurality of stacked layers of the positive and negative tabs. After a long period of observation, it was noticed that, if pre-welding is performed with the above-mentioned method, a fusion region will easily crack during subsequent laser welding of a finished tab on which welding is completed (i.e., an entirety formed by the positive and negative tabs subjected to two times of ultrasonic welding, which will be collectively referred to as the finished tab for simplicity) to the poles, affecting a current flow capacity and structural strength.

After the above problems were discovered, a large number of experiments and analyses were conducted, and the following reasons that may lead to the above problems are identified.

The interlayer gaps exist in the finished tab that has been subjected to pre-welding of the toothed welding head. When laser welding is performed on the finished tab and the poles subsequently, the interlayer gaps will generate a large number of pores during the laser welding, and a large amount of heat buildup leads to cracks in the fusion region. The large number of pores will reduce an effective connection region, affecting the current flow capacity.

Figure 2:
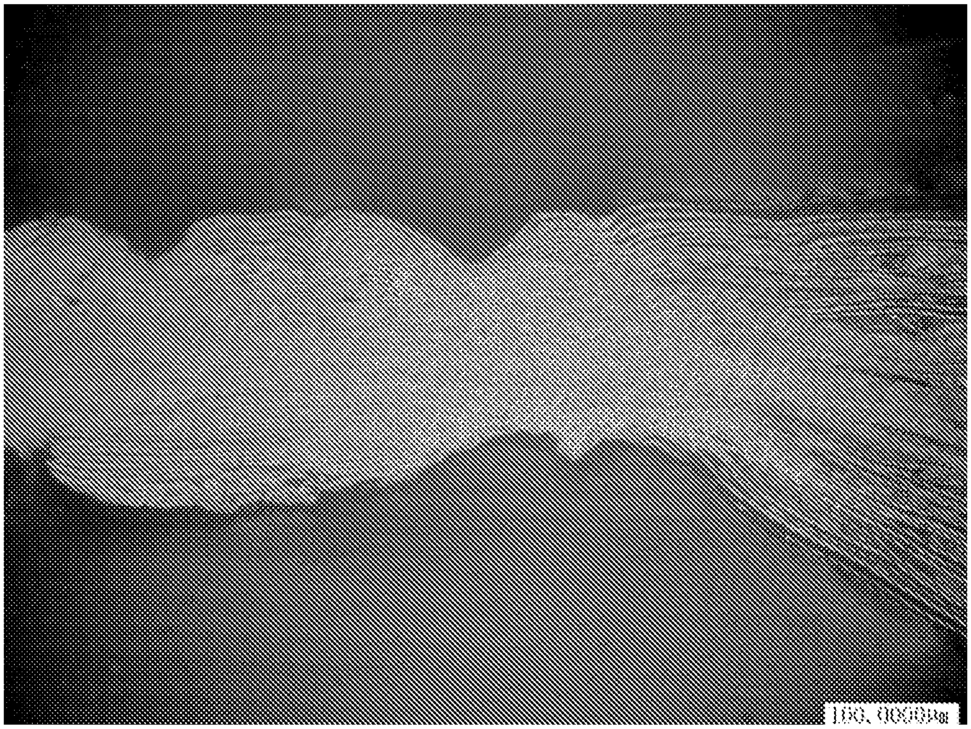
FIG. 2 is a view of an effect obtained after ultrasonic pre-welding in some scenarios.

As illustrated in FIG. 1 and FIG. 2, specifically, in some cases, for the battery cell, ultrasonic pre-welding is performed on the positive tabs and the negative tabs, which, along with a welding technique that the finished tab is fixed to the poles through the laser welding, results in cracks on both sides of laser weld seams between the finished tab and the poles, affecting the current flow capacity and the structural strength. Further, pores and gaps are generated in the finished tab during the laser welding, which reduce the effective connection region, affecting the current flow capacity.

In addition, further experiments and verifications were conducted on a material of the battery cell. The battery cell is made of aluminum foil. Some physical properties of the aluminum foil are compared with those of the copper foil. Results of the comparison are as illustrated in Table 1, which shows the comparison between some physical properties of the aluminum foil and those of the copper foil.

TABLE 1

| / | Material | Melting point | Coefficient of thermal conductivity | Expansion coefficient |
|---|---|---|---|---|
| Copper foil | Pure copper | 1,083° C. | 397 W/m*k | $1.75 \times 10^{-5}$/k |
| Aluminum foil | Al 1060 | 667° C. | 217 W/m*k | $2.23 \times 10^{-5}$/k |

Table 1 reveals that a high shrinkage ratio of the metal aluminum during solidification leads to necking of a liquid metal in a welding pool interface for tabs. Pores are generated in the interlayer gaps when the tabs are welded. However, the interlayer gaps cause the liquid metal, when subjected to the necking, to fail to fill in when welded to the pole, resulting in cracks in the weld seams.

Therefore, it was found that, the interlayer gaps in the positive and negative tabs that have been subjected to the pre-welding need to be eliminated to improve welding performance between the finished tab and the poles. To eliminate the interlayer gaps, a scheme of ultrasonic pre-welding needs to be optimized and improved.

Based on the above considerations, to reduce cracks generated when the finished tab is welded to the poles, and to solve the problem that the interlayer gaps are easily generated during the per-welding on the plurality of layers of tabs, a tab welding method is designed after an in-depth study. In the tab welding method, a special pre-welding scheme combining a toothed welding head and a toothless welding head is adopted to allow the plurality of stacked layers of the positive and negative tabs to form a compact overall structure after two times of ultrasonic welding, which eliminates the interlayer gaps, solving problems of welding pores and cracks in the fusion region that arise during the laser welding performed on the finished tab and the poles.

The battery cell disclosed in the embodiments of the present disclosure may be, but is not limited to being, applied in an electric device such as a vehicle, a ship, or an aircraft.

In the following embodiments, as an example, an electric device according to an embodiment of the present disclosure is described as a vehicle 1000 for convenience of description.

Figure 3:
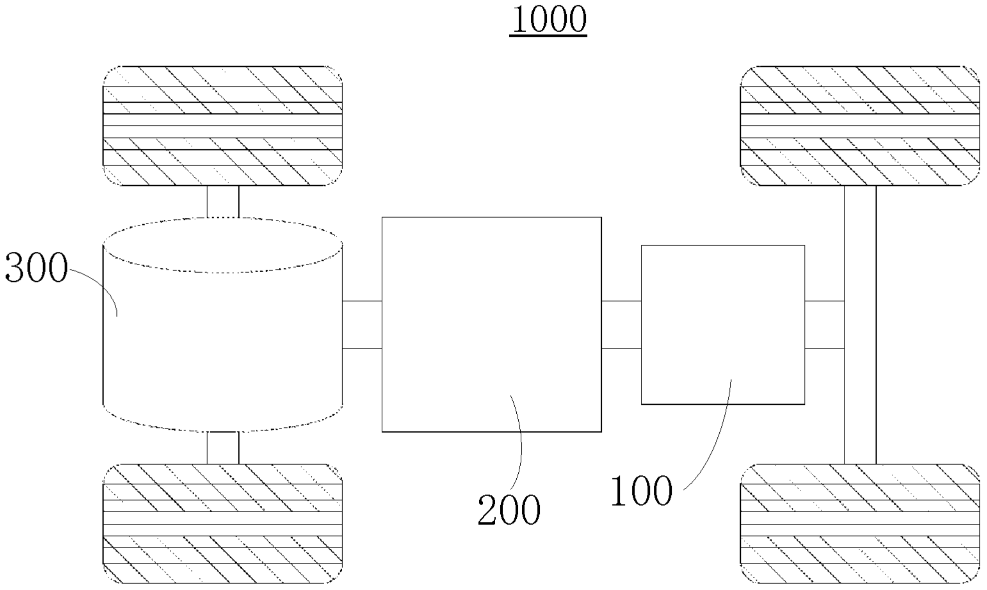
FIG. 3 is a schematic structural view of a vehicle according to an embodiment of the present disclosure.

FIG. 3 is a schematic structural view of a vehicle 1000 according to an embodiment of the present disclosure. Referring to FIG. 3, a battery 100 is disposed in the vehicle 1000. The battery 100 may be disposed at a bottom or a head or a tail of the vehicle 1000, and can be configured to supply power to the vehicle 1000. For example, the battery 100 may be used as a power source for operation of the vehicle 1000. The vehicle 1000 may further include a controller 200 and a motor 300. The controller 200 is configured to control the battery 100 to supply power to the motor 300, e.g., for operational power needs in starting, navigation, and traveling of the vehicle 1000.

In some embodiments of the present disclosure, the battery 100 may not only serve as the power source for operation of the vehicle 1000, but also serve as a drive power source for the vehicle 1000 in lieu of, or in part in lieu of a fuel oil or a natural gas to provide drive power for the vehicle 1000.

Figure 4:
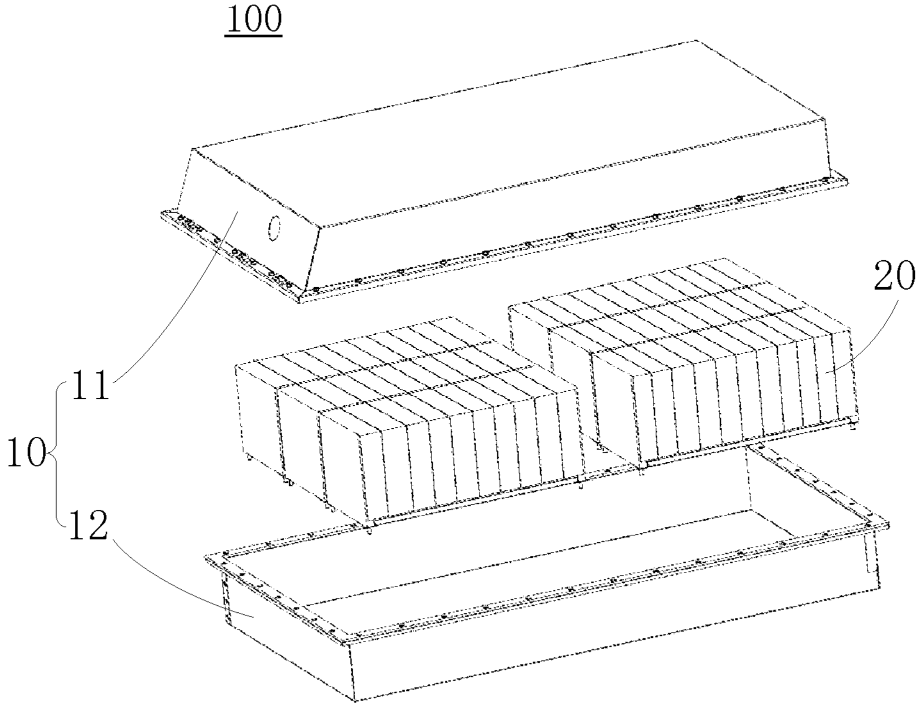
FIG. 4 is a schematic exploded view of a structure of a battery according to an embodiment of the present disclosure.

FIG. 4 is an exploded view of the battery 100 according to some embodiments of the present disclosure. Referring to FIG. 4, the battery 100 includes a case 10 and a battery cell 20. The battery cell 20 is accommodated in the case 10. The case 10 is configured to provide an accommodation space for the battery cell 20 and may be of various structures. In some embodiments, the case 10 may include a first portion 11 and a second portion 12 that are capped on each other. The accommodation space for accommodating the battery cell 20 is defined by the first portion 11 and the second portion 12 together. The second portion 12 may have a hollow structure with an open end while the first portion 11 may have a plate-like structure. The first portion 11 is capped at an open side of the second portion 12 to define the accommodation space by the first portion 11 and the second portion 12 together. Each of the first portion 11 and the second portion 12 may also have a hollow structure with an open side. The open side of the first portion 11 is capped at the open side of the second portion 12. Of course, the case 10 formed by the first portion 11 and the second portion 12 may be of various shapes, such as a cylinder and a cuboid.

In the battery 100, a plurality of battery cells 20 may be provided. The plurality of battery cells 20 may be connected in series or in parallel or in series and parallel. The expression "in series and parallel" means that the plurality of battery cells 20 is connected both in series and in parallel. The plurality of battery cells 20 may be directly connected in series or in parallel or in series and parallel, and then accommodated in the case 10 as a whole. Of course, for the battery 100, the plurality of battery cells 20 may also be connected in series or in parallel or in series and parallel to form a battery module, and then a plurality of battery modules may be connected in series or in parallel or in series and parallel and accommodated in the case 10 as a whole. The battery 100 may further have other structures. For example, the battery 100 may further include a busbar configured to implement an electrical connection between the plurality of battery cells 20.

Each battery cell 20 may be a rechargeable battery or a primary battery. The battery cell may further be a lithium-sulfur battery, a sodium-ion battery, or a magnesium-ion battery. The present disclosure is not limited to any of these examples.

Figure 5:
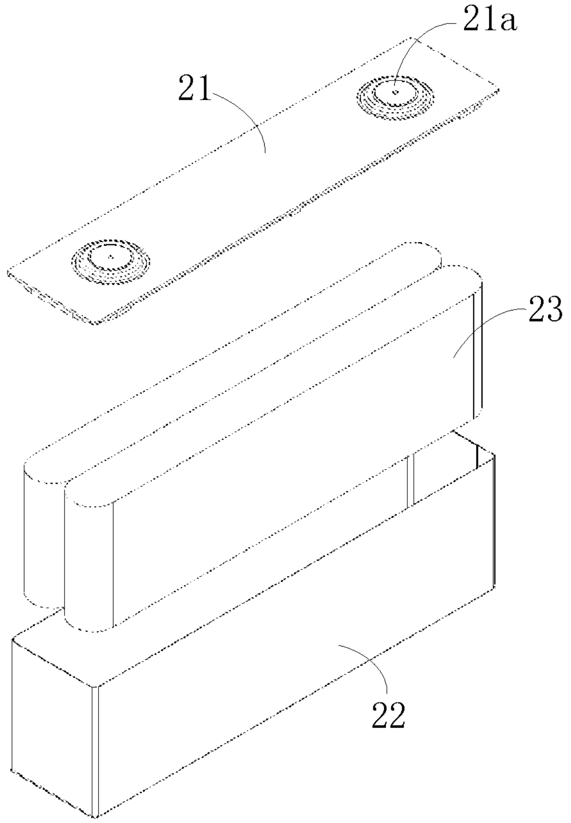
FIG. 5 is a schematic exploded view of a structure of a battery cell according to an embodiment of the present disclosure.

FIG. 5 is a schematic exploded view of a structure of the battery cell 20 according to some embodiments of the present disclosure. The battery cell 20 is the smallest unit that makes up a battery. Referring to FIG. 5, the battery cell 20 includes an end cover 21, a housing 22, a battery cell assembly 23, and other functional members.

The end cover 21 is a member that covers an opening of the housing 22 to isolate an internal environment of the battery cell 20 from an external environment. Without limitation, a shape of the end cover 21 may be adapted to a shape of the housing 22 to cooperate with the housing 22. Optionally, the end cover 21 may be made of a material having a predetermined degree of hardness and strength (e.g., an aluminum alloy). In this way, the end cover 21 is less likely to deform when subjected to a compression and a collision, enabling the battery cell 20 to have higher structural strength and improved safety performance. Functional members such as an electrode terminal 21*a* may be disposed at the end cover 21. The electrode terminal 21*a* can be configured to be electrically connected to the battery cell assembly 23 to output or input electric energy of the battery cell 20. In some embodiments, a pressure relief mechanism may further be disposed at the end cover 21. The pressure relief mechanism is configured to release an internal pressure of the battery cell 20 when the internal pressure or a temperature of the battery cell 20 reaches a threshold. The end cover 21 may be made of a variety of materials, such as copper, iron, aluminum, stainless steel, aluminum alloy, and plastic. The embodiments of the present disclosure are not specifically limited to any of these examples. In some embodiments, an insulator may also be disposed at an inner side of the end cover 21. The insulator can be configured to isolate an electrical connector in the housing 22 from the end cover 21, to reduce a short-circuit risk. For example, the insulator may be made of plastic, rubber, or the like.

The housing 22 is an assembly configured to cooperate with the end cover 21 to form the internal environment of the battery cell 20. The formed internal environment can be configured to accommodate the battery cell assembly 23, the electrolyte, and other members. The housing 22 and the end cover 21 may be independent members. An opening may be formed at the housing 22. The internal environment of the battery cell 20 may be formed by covering the opening with the end cover 21. Without limitation, the end cover 21 and the housing 22 may also be integrally formed. Specifically, a common connection surface may be formed by the end cover 21 and the housing 22 before other members are put into the housing. The end cover 21 is made to cover the housing 22 when it is needed to package an interior of the housing 22. The housing 22 may have various shapes and various dimensions, such as a cuboid shape, a cylinder shape, and a hexagonal prism shape. Specifically, the shape of the housing 22 may be determined based on a specific shape and a specific dimension size of the electrode assembly 23. The housing 22 may be made of various materials, such as copper, iron, aluminum, stainless steel, aluminum alloy, and plastic. The embodiments of the present disclosure are not specially limited to any of these examples.

The electrode assembly 23 is a member, in the battery cell 20, where an electrochemical reaction occurs. One or more electrode assemblies 23 may be included in the housing 22. The electrode assembly 23 is formed primarily by winding or stacking a positive electrode sheet and a negative electrode sheet. Typically, a separator is located between the positive electrode sheet and the negative electrode sheet. Parts of the positive electrode sheet and the negative electrode sheet that contain active substances form a main body portion of the electrode assembly 23. Parts of the positive electrode sheet and the negative electrode sheet that contain no active substances each form a tab. A positive tab and a negative tab may be both located at one end of the main body portion, or may be located at two ends of the main body portion 100, respectively. During charging and discharging of the battery, positive active substances and negative active substances are reacted with the electrolyte. The tab is connected to the electrode terminal 21*a* to form a current circuit.

Figure 6:
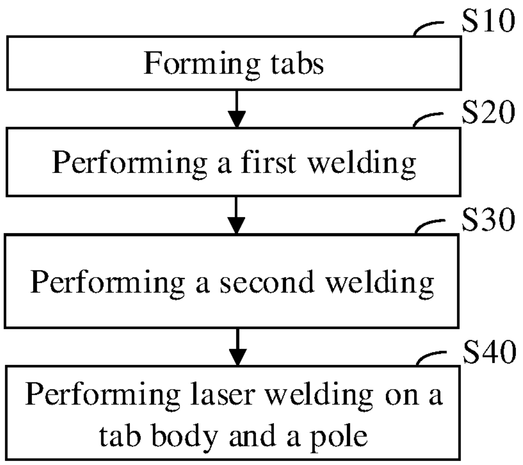
FIG. 6 is a flowchart illustrating a tab welding method according to an embodiment of the present disclosure.
Figure 7:
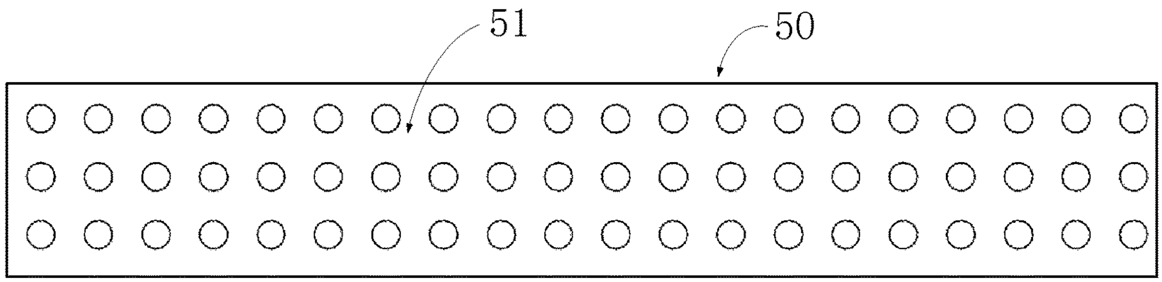
FIG. 7 is a schematic view obtained after first welding according to an embodiment of the present disclosure.
Figure 8:
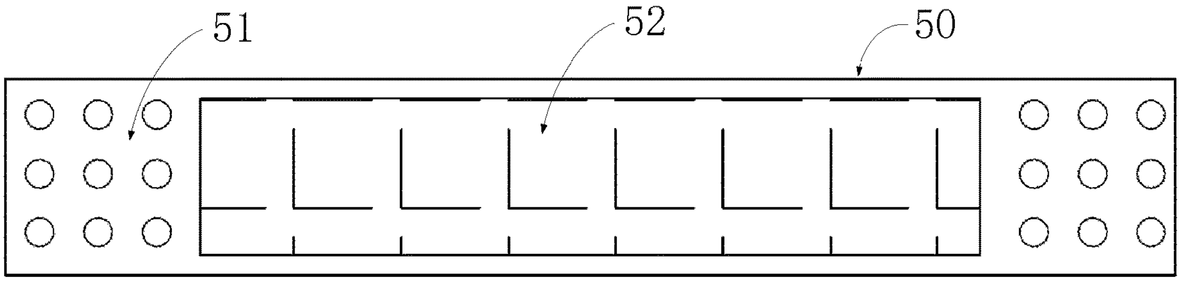
FIG. 8 is a schematic view of a structure obtained after second welding according to an embodiment of the present disclosure.

Referring to FIG. 6, FIG. 7, and FIG. 8, a tab welding method is provided according to an embodiment of the present disclosure. The tab welding method includes the steps S10, S20, S30, and S40.

In step S10 of forming tabs, including forming a plurality of stacked layers of positive tabs and negative tabs by sequentially stacking a plurality of layers of positive electrode sheets and a plurality of layers of negative electrode sheets.

In step S20 of performing a first welding, including performing welding on the plurality of stacked layers of positive tabs and negative tabs using a toothed welding head (not illustrated in the figures), to form a tab body 30 having a first weld spot region 31.

The toothed welding head used for the first welding has a size of 5 millimeters (mm)×30 millimeters (mm), and thus the first weld spot region 31 formed through welding by the toothed welding head has an area of 5 mm×30 mm. Further, the toothed welding head has a weld tooth height of 0.45 mm. In addition, the toothed welding head is a spherical-tooth welding head having a weld tooth radius of 0.8 mm and a weld tooth pitch of 0.32 mm. After welding of the toothed welding head, the uneven first weld spot region 31 is formed, enabling a solid-phase connection for the tab body 30.

In step S30 of performing a second welding, including performing the second welding on the tab body 30 using a toothless welding head 40, to form a second weld spot region 32.

Figure 9:
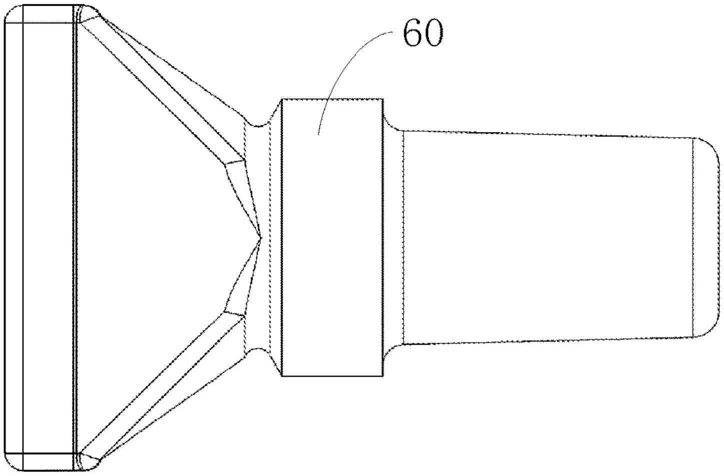
FIG. 9 is a schematic structural view of a toothless welding head according to an embodiment of the present disclosure.

As illustrated in FIG. 9, it should be noted that the toothless welding head 40 has a welding surface formed as a smooth surface. Thus, the uneven first weld spot region 31 is shaped and flattened by the toothless welding head 40, which avoids a slip during ultrasonic vibrations, and eliminates gaps of the plurality of stacked layers of the positive tabs and the negative tabs of the tab body 30.

In some embodiments, the toothless welding head 40 has a size of 4 mm×20 mm. Thus, the second weld spot region 32 formed through welding by the toothless welding head 40 has an area of 4 mm×20 mm, in such a manner that the second weld spot region 32 is located in the first weld spot region 31. Further, the second weld spot region 32 is smaller than the first weld spot region 31. In addition, the first weld spot region 31 has a center point coinciding with a center point of the second weld spot region 32.

In some embodiments, each of the first welding and the second welding is ultrasonic welding.

Specifically, since the ultrasonic pre-welding is performed, by the high toothed welding head, on the plurality of stacked layers of the positive tabs and the negative tabs during the first welding, the solid-phase connection is realized between the plurality of stacked layers of the positive tabs and the negative tabs. Compared with a flat-tooth welding head, the toothed welding head has higher strength, and thus a welding part is less likely to be broken apart by ultrasonic vibrations during the second welding. Regarding the second welding, the toothless welding head 40 is used for the ultrasonic vibrations. In addition, since the second weld spot region 32 is smaller than the first weld spot region 31 and located above the first weld spot region 31, a slip caused when the toothless welding head 40 performs welding on a smooth surface can be avoided, and thus the uneven part can be shaped and flattened, eliminating the interlayer gaps.

In some embodiments, the toothless welding head 40 has an arc chamfer with a radius of 1 mm. With the arc chamfer, the welding head can be in close contact with a weld spot region during welding, which improves welding performance.

Step S40, the tab body 30 subjected to two times of welding is fixedly connected to a pole through laser welding.

After two times of ultrasonic pre-welding were performed based on data shown in Table 2 below, laser welding was performed and results shown in Table 3 below were obtained. Table 2 shows parameter values for the two times of ultrasonic pre-welding. Table 3 shows parameter results for the laser welding.

TABLE 2

| Ultrasonic pre-welding window for tabs | | | | | | |
|---|---|---|---|---|---|---|
| Ultrasonic welding | Energy J | Atmospheric pressure/ Psi | Amplitude um | Welding head specification mm | Tooth height mm | Tooth profile |
| first time | 500 | 40 | 30 | 5 × 30 | 0.45 | Spherical |
| second time | 200 | 25 | 30 | 4 × 20 | 0 | Toothless |

TABLE 3

| Laser welding window | | | |
|---|---|---|---|
| Power/w | Linear velocity/(mm/s) | Defocusing amount/mm | Weld seam length/mm |
| 2,500 | 50 | −4 | 15 |

Figure 10:
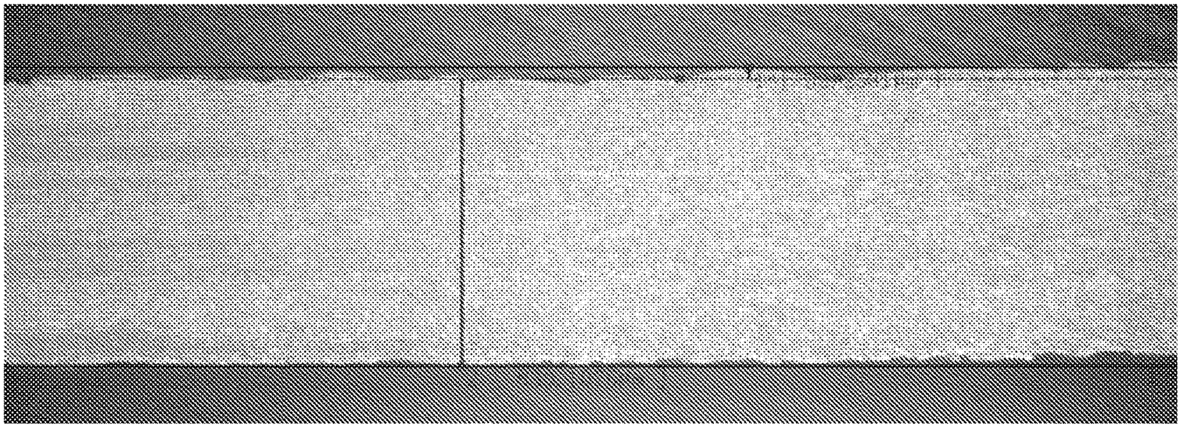
FIG. 10 is a schematic view of an effect obtained after ultrasonic pre-welding according to an embodiment of the present disclosure.
Figure 11:
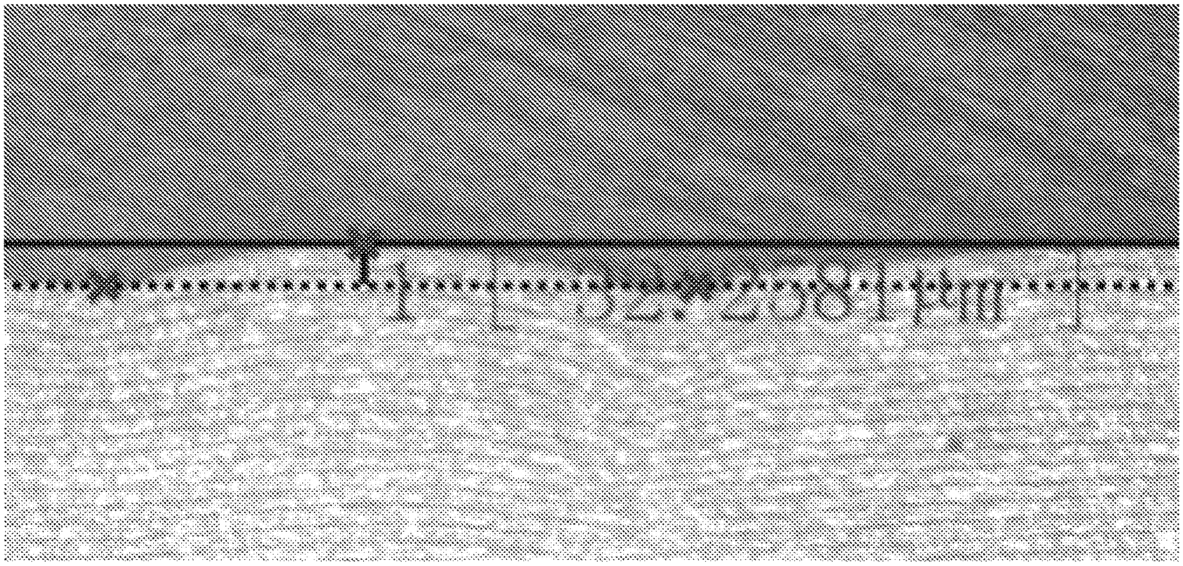
FIG. 11 is a partially enlarged view for FIG. 10.
Figure 12:
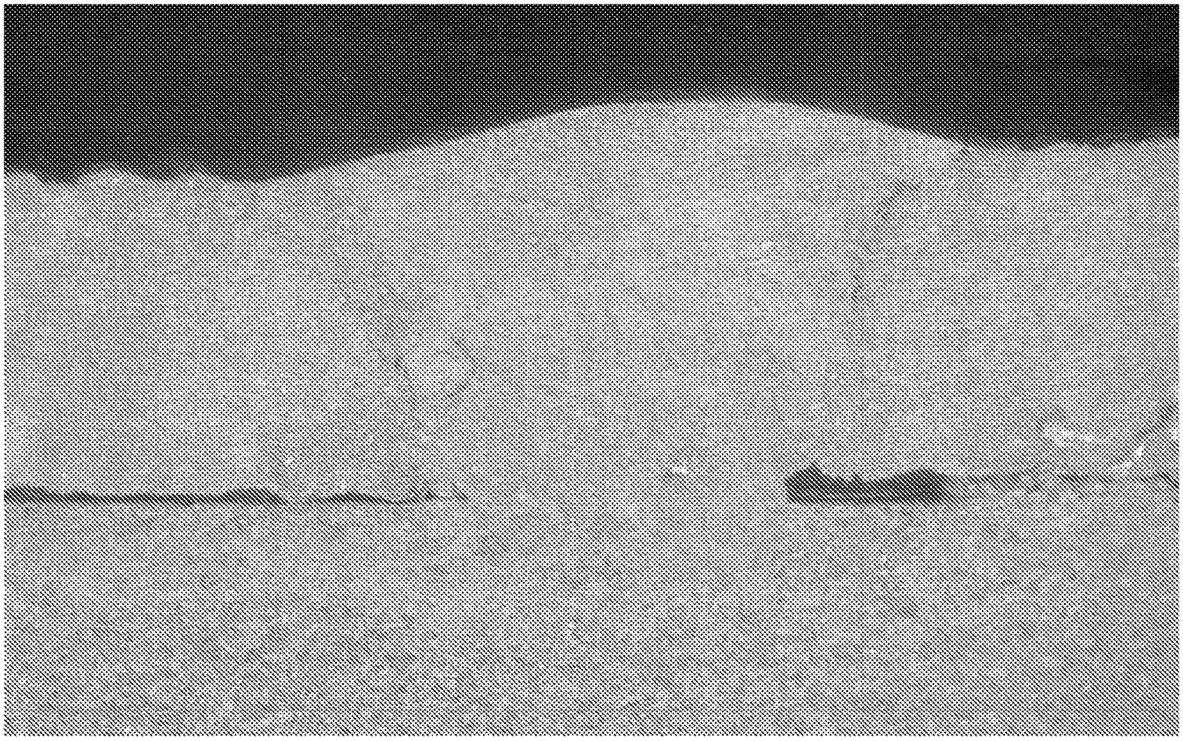
FIG. 12 is a schematic view of an effect obtained after laser welding according to an embodiment of the present disclosure.

From Table 2 and Table 3, it can be concluded that after welding is performed, using the above-mentioned tab welding method, on the plurality of stacked layers of the positive tabs and the negative tabs, no pores or cracks present between the plurality of stacked layers of the positive tabs and negative tabs, as illustrated in FIG. 10 and FIG. 11. In addition, for the tab body 30 subjected to the two times of ultrasonic pre-welding and the pole subjected to the laser welding, similarly, no pores or cracks present, as illustrated in FIG. 12. Thus, with the above-mentioned tab welding method, the interlayer gap and pores can be effectively eliminated, solving a problem that cracks are likely to occur when welding the tabs to the poles.

Based on the same concept as the above-mentioned tab welding method, the present disclosure further provides a tab welding tool for performing the above-mentioned tab welding method. The tab welding tool includes the toothless welding head 40 and the toothed welding head (not illustrated in the figures). The toothed welding head has the weld tooth height of 0.45 mm. In addition, the toothed welding head is the spherical-tooth welding head having the weld tooth radius of 0.8 mm and the weld tooth pitch of 0.32 mm. The toothless welding head 40 has a welding surface formed as a smooth surface. Thus, the uneven region obtained after the first welding is shaped and flattened by the toothless welding head 40, which avoids a slip during ultrasonic vibrations, and eliminates gaps of the plurality of stacked layers of the tabs of the tab body 30.

In some embodiments, the toothed welding head having a welding region formed as the first weld spot region 31, and the toothless welding head 40 having a welding region formed as the second weld spot region 32. The second weld spot region 32 is smaller than the first weld spot region 31. The first weld spot region 31 has a center point coinciding with a center point of the second weld spot region 32.

In some embodiments, the toothless welding head 40 has the size of 4 mm×20 mm, while the toothed welding head has the size of 5 mm×30 mm. Thus, the first weld spot region 31 formed through welding by the toothed welding head has an area of 5 mm×30 mm, and the second weld spot region 32 formed through welding by the toothless welding head 40 has an area of 4 mm×20 mm, in such a manner that the second weld spot region 32 is located within the first weld spot region 31.

Since the welding is performed, by the high toothed welding head, on the plurality of stacked layers of the positive tabs and the negative tabs during the first welding, a solid-phase connection is realized between the plurality of stacked layers of the positive tabs and the negative tabs. Compared with the flat-tooth welding head, the toothed welding head has higher strength, and thus the welding part is less likely to be broken apart by the ultrasonic vibrations during the second welding. Regarding the second welding, the toothless welding head 40 is used for the ultrasonic vibrations. In addition, since the second weld spot region 32 is smaller than the first weld spot region 31 and located above the first weld spot region 31, a slip caused when the toothless welding head 40 performs welding on the smooth surface can be avoided, and thus the uneven part can be shaped and flattened, eliminating the interlayer gaps.

In some embodiments, the toothless welding head 40 has the arc chamfer with the radius of 1 mm. With the arc chamfer, the welding head can be in close contact with the weld spot region during welding, which improves the welding performance.

Based on the same concept as the above-mentioned tab welding method, the present disclosure further provides a battery cell prepared by the above-mentioned tab welding method.

Based on the same concept as the above-mentioned battery cell, the present disclosure further provides a battery. The battery includes a housing and the above-mentioned battery cell. The battery cell is disposed in the housing.

Based on the same concept as the above-mentioned battery, the present disclosure further provides an electric device. The electric device includes an electrical body and the above-mentioned battery.

In the practice of the present disclosure, the plurality of layers of positive electrode sheets and the plurality of layers of negative electrode sheets are stacked to each other separately, to form the plurality of stacked layers of positive tabs and negative tabs. Subsequently, the ultrasonic welding is performed, using the toothed welding head, on the plurality of stacked layers of positive tabs and negative tabs, to form the tab body 30 having the first weld spot region 31. Further, the ultrasonic welding is performed on the tab body 30 using the smooth toothless welding head 40 to form the second weld spot region 32. In addition, the second weld spot region 32 is made to be located within the first weld spot region 31, in such a manner that the center point of the first weld spot region 31 coincides with the center point of the second weld spot region 32.

After the two times of ultrasonic welding are performed on the plurality of stacked layers of the positive tabs and the negative tabs, the pre-welded tab body 30 is fixedly connected to the poles through laser welding. Thus, the entire welding process is completed.

The tab welding method, the welding tool, the battery cell, the battery, and the electric device in the above embodiments can provide at least the following advantages.

First, the uneven welding surface formed through the welding by the toothed welding head can be shaped and flattened by the toothless welding head 40, which can avoid a slip of the toothless welding head 40 during performing welding on a smooth surface, eliminating interlayer gaps to solve a cracking problem.

Second, the arc chamfer having the radius of 1 mm disposed at the toothless welding head 40 can enable the welding head to be in close contact with the weld spot region during welding, which improves the welding performance.

Third, the toothless welding head 40 has a simple structure and is easy to operate, which is conducive to promotion of the toothless welding head 40.

Finally, it should be noted that each of the above embodiments is used only to illustrate, rather than to limit, the technical solutions of the present disclosure. Although the present disclosure has been described in detail with reference to the foregoing embodiments, it is conceivable for those skilled in the art that modifications can be made to the technical solutions described in the foregoing embodiments, or equivalent replacements can be made to some or all of the technical features in the technical solutions described in the foregoing embodiments. These modifications or equivalent replacements, which do not depart the essence of corresponding technical solutions from the scope of the technical solutions of the embodiments of the present disclosure, shall fall within the scope of the claims and the specification of the present disclosure. In particular, the technical features mentioned in individual embodiments can be combined arbitrarily without any structural conflict. The present disclosure is not limited to the particular embodiments disclosed herein, and includes all technical solutions falling within the scope of the claims.

What is claimed is:

1. A tab welding method, comprising:

forming tabs, comprising forming a plurality of stacked layers of positive tabs and negative tabs by sequentially stacking a plurality of layers of positive electrode sheets and a plurality of layers of negative electrode sheets;

performing a first welding, comprising performing welding on the plurality of stacked layers of positive tabs and negative tabs using a toothed welding head, to form a tab body having a first weld spot region; and performing a second welding, comprising performing the second welding on the tab body using a toothless welding head, to form a second weld spot region.

2. The tab welding method according to claim 1, wherein the toothed welding head has a size of 5 mm×30 mm.

3. The tab welding method according to claim 1, wherein the toothed welding head has a weld tooth height of 0.45 mm.

4. The tab welding method according to claim 1, wherein the toothed welding head has a weld tooth radius of 0.8 mm and a weld tooth pitch of 0.32 mm.

5. The tab welding method according to claim 1, wherein the toothless welding head has a welding surface formed as a smooth surface.

6. The tab welding method according to claim 1, wherein the toothless welding head has a size of 4 mm×20 mm.

7. The tab welding method according to claim 5, wherein the toothless welding head has an arc chamfer with a radius of 1 mm.

8. The tab welding method according to claim 1, wherein:

the second weld spot region is smaller than the first weld spot region; and the first weld spot region has a center point coinciding with a center point of the second weld spot region.

9. The tab welding method according to claim 1, wherein each of the first welding and the second welding is ultrasonic welding.

10. A tab welding tool for performing the tab welding method according to claim 1, the tab welding tool comprising the toothless welding head, the toothless welding head having a welding surface formed as a smooth surface.

11. The tab welding tool according to claim 10, wherein the toothless welding head has a size of 4 mm×20 mm.

12. The tab welding tool according to claim 10, wherein the toothless welding head has an arc chamfer with a radius of 1 mm.

13. The tab welding tool according to claim 10, further comprising the toothed welding head, the toothed welding head having a welding region formed as the first weld spot region, and the toothless welding head having a welding region formed as the second weld spot region, wherein:

the second weld spot region is smaller than the first weld spot region; and the first weld spot region has a center point coinciding with a center point of the second weld spot region.

14. The tab welding tool according to claim 13, wherein the toothed welding head has a size of 5 mm×30 mm.

15. The tab welding tool according to claim 13, wherein the toothed welding head has a weld tooth height of 0.45 mm.

16. The tab welding tool according to claim 13, wherein the toothed welding head has a weld tooth radius of 0.8 mm and a weld tooth pitch of 0.32 mm.

17. A battery cell, the battery cell being prepared by the tab welding method according to claim 1.

18. A battery, comprising:

a housing; and the battery cell according to claim 17, the battery cell being disposed in the housing.

19. An electric device, comprising:

an electrical body; and the battery according to claim 18.

* * * * *